US007242966B1

(12) United States Patent
Averkamp

(10) Patent No.: US 7,242,966 B1
(45) Date of Patent: Jul. 10, 2007

(54) PERSONAL TELEMATICS DEVICE

(75) Inventor: Joseph Averkamp, Stilwell, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 773 days.

(21) Appl. No.: 10/213,710

(22) Filed: Aug. 5, 2002

Related U.S. Application Data

(63) Continuation-in-part of application No. 09/724,004, filed on Nov. 28, 2000.

(51) Int. Cl.
*H04M 1/00* (2006.01)

(52) U.S. Cl. .................................. 455/564; 455/552.1

(58) Field of Classification Search ............... 455/563, 455/564, 550.1, 552.1, 556.1, 557, 558, 565, 455/414.1, 418, 420, 575.1, 569.1, 569.2; 379/88.01–88.03; 704/256, 265; 340/573.1, 340/612
See application file for complete search history.

(56) References Cited

U.S. PATENT DOCUMENTS

| 5,912,949 | A | * | 6/1999 | Chan et al. | 379/88.03 |
| 5,915,228 | A | * | 6/1999 | Kunihiro et al. | 455/575.1 |
| 6,035,217 | A | * | 3/2000 | Kravitz | 455/564 |
| 6,144,723 | A | * | 11/2000 | Truchon et al. | 379/88.01 |
| 6,377,825 | B1 | * | 4/2002 | Kennedy et al. | 455/563 |

* cited by examiner

*Primary Examiner*—George Eng
*Assistant Examiner*—Sam Bhattacharya

(57) ABSTRACT

A system and method for a personal telematics device (PTD) are provided. In an exemplary embodiment, a PTD may include an actuator that can be selectively activated by a user. Furthermore, the PTD may include a controller in communication with the actuator. The controller may send an instruction signal to a wireless device coupled to the PTD in response to activation of the actuator. Additionally, the wireless device may connect the personal telematics device to an answering entity in response to receiving the instruction signal. The answering entity may then perform a user service corresponding to the actuator activated by the user.

24 Claims, 9 Drawing Sheets

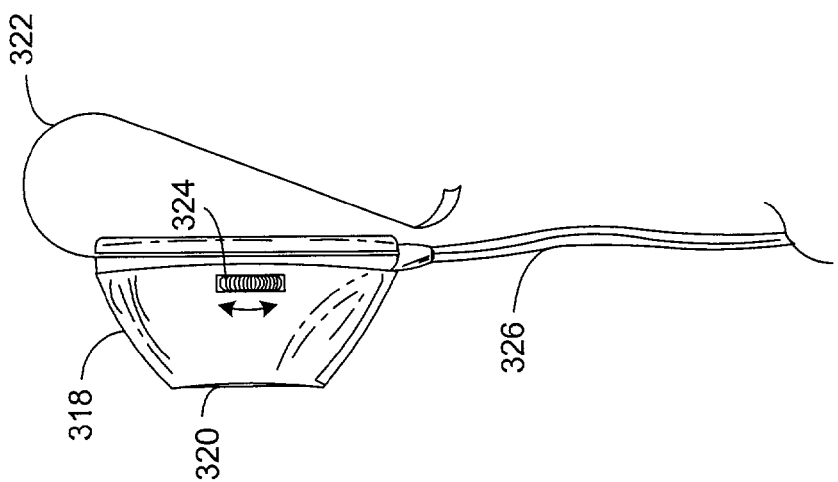
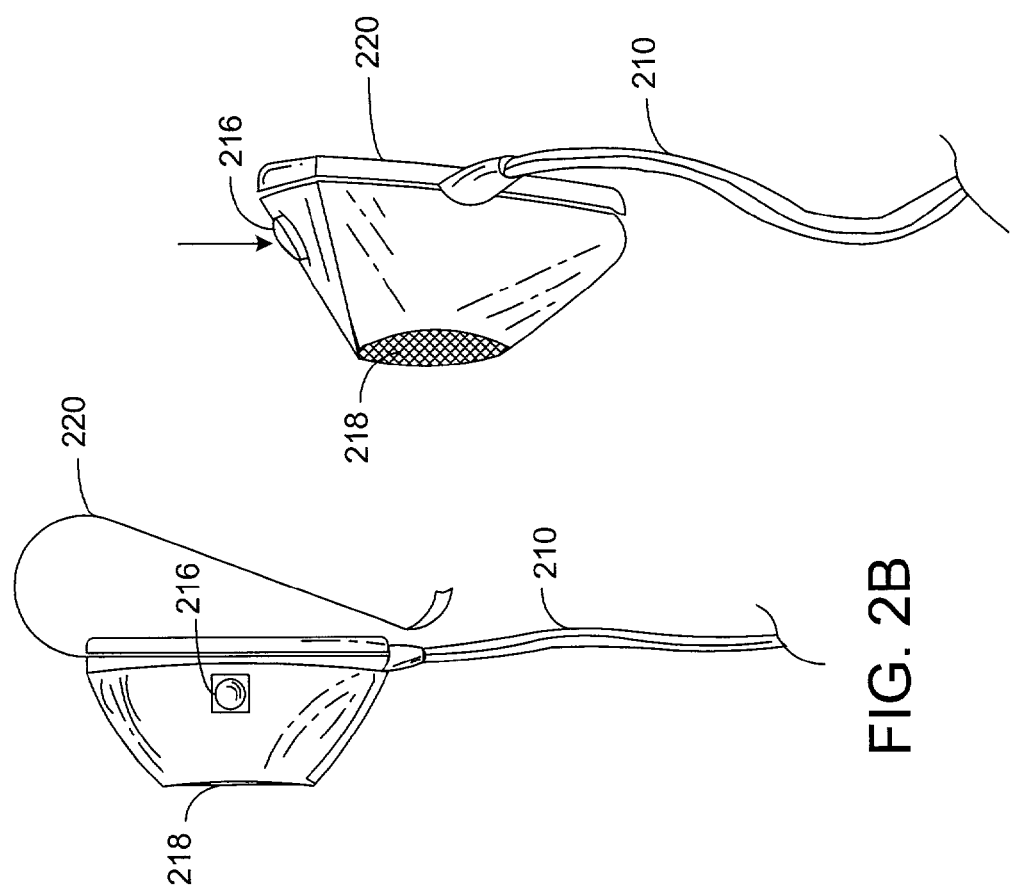
FIG. 3
FIG. 2C
FIG. 2B

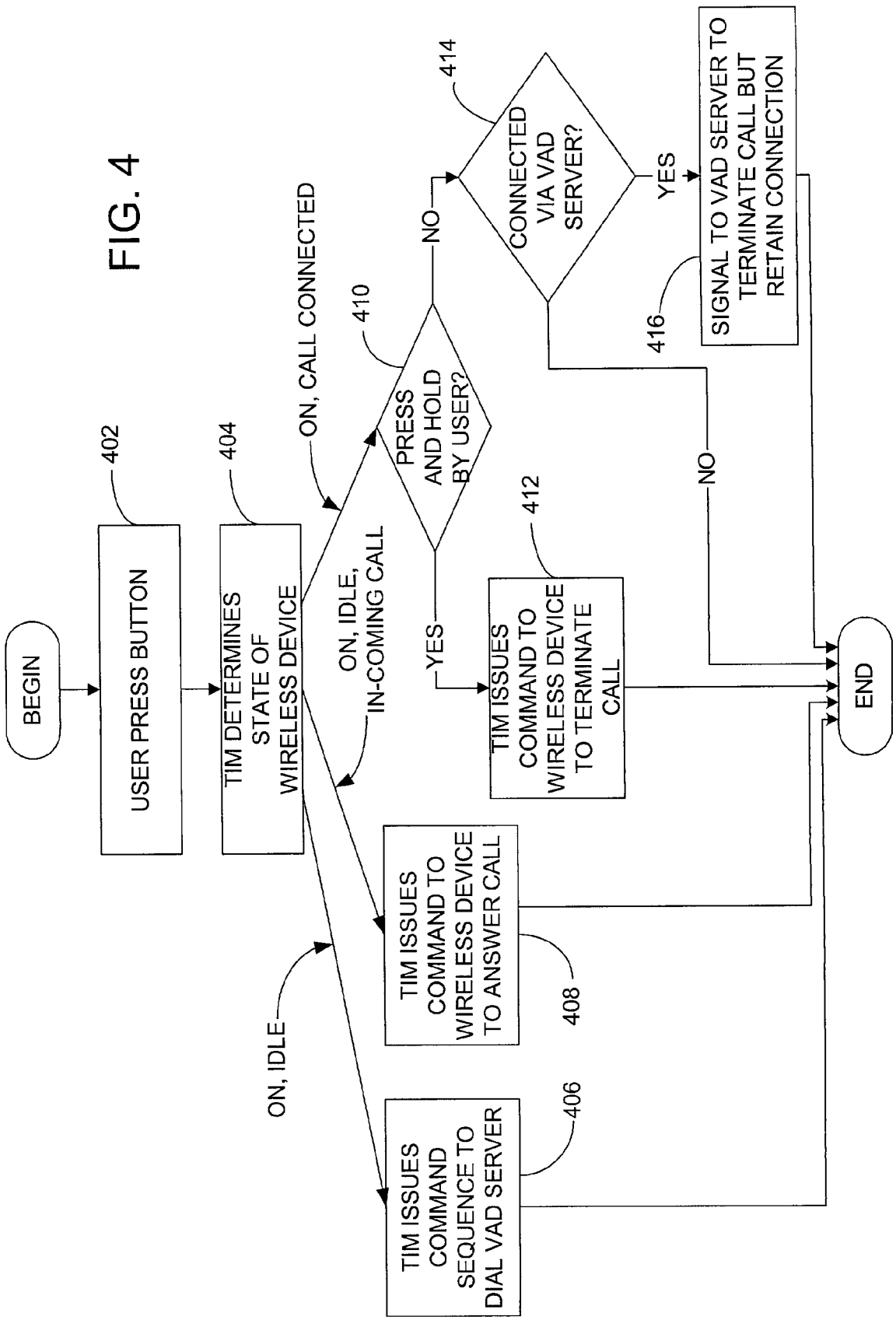

PERSONAL TELEMATICS DEVICE

RELATED APPLICATION

This application is a continuation-in-part of, and incorporates by reference, U.S. patent application Ser. No. 09/724,004, filed on Nov. 28, 2000, entitled "Method And System For Simplified Control Of A Subscriber Terminal", having inventor Joseph Averkamp, and being assigned to the assignee of the present application.

FIELD OF THE INVENTION

This invention relates to telecommunications services and more particularly, to a personal telematics device for use within a wireless communications system.

BACKGROUND OF THE INVENTION

The importance of wireless telecommunications in modern society continues to grow. People and businesses throughout the world increasingly depend on wireless technology as a way to communicate and share ideas. In particular, users today often use wireless subscriber terminals that are integrated within vehicles, such as cars, trucks, aircrafts, or sea vessels. These wireless subscriber terminals often enable users to wirelessly communicate with a network in order to access a variety of different services.

Unfortunately, current systems that enable wireless access from a vehicle to a network often include a number of drawbacks. For example, existing systems typically use dedicated wireless transceivers that are embedded or otherwise integrated within a vehicle. Thus, a user may be unable to readily transfer such a system for use in another vehicle. Also, during times when the vehicle is not in use, these dedicated transmitters are often left idle and useless. Further, existing systems typically require the use of substantial hardware and computing resources, making such systems relatively costly.

Accordingly, it is desirable to have a system and method for enabling wireless access to a network that overcomes the above deficiencies associated with the prior art.

SUMMARY OF THE INVENTION

In accordance with an exemplary embodiment, a system and method are provided for using a personal telematics device (PTD) within a telematics system.

According to an aspect of an exemplary embodiment, a PTD may be couplable externally to a wireless device. The PTD may include an actuator that can be selectively activated by a user and a controller in communication with the actuator. Additionally, the controller may send an instruction signal to the wireless device in response to activation of the actuator. Also, the wireless device may wirelessly connect the PTD to an answering entity in response to receiving the instruction signal. The answering entity may further perform a user service corresponding to the actuator activated by the user.

In another aspect of an exemplary embodiment, a method may be carried out at a PTD that is couplable externally to a wireless device. The method may include initiating an instruction signal in response to a user activating a voice command actuator. Additionally, the method may include sending the instruction signal to the wireless device and connecting to a voice-activated-dialing server via the wireless device. Further, the method may include receiving a voice command from a user via a microphone and encoding the voice command within a digital audio signal. The method may also include sending the digital audio signal to the voice-activated-dialing server via the wireless device. Additionally, the PTD may connect to a terminal device via the wireless device in response to the voice-activated-dialing server recognizing the voice command encoded within the digital audio signal.

Furthermore, in yet another aspect of an exemplary embodiment, a PTD may be couplable externally to a cellular telephone and include an actuator array having a first actuator and a second actuator. Additionally, the PTD may include a controller in communication with the actuator array. Further, the controller may send an instruction signal to the cellular telephone in response to activation of at least one of the first actuator and the second actuator. In addition, the PTD may also include a microphone for receiving a speech signal from a user and converting the speech signal into an analog audio signal. The PTD may also include an audio processing module for converting the analog audio signal into a digital audio signal. The PTD may further include a data port for receiving ancillary data from an ancillary device, and a data processing module that receives and processes the ancillary data from the data port. Also, the PTD may include an audio/data multiplexer in communication with the audio processing module and the data processing module. Additionally, the controller may use the audio/data multiplexer to select whether the ancillary data or the digital audio data is sent to the cellular telephone.

Additionally, in another aspect of an exemplary embodiment, a PTD may be couplable externally to a wireless device, and the PTD may include means for initiating an instruction signal in response to a user activating a voice command actuator. Furthermore, the PTD may also include means for sending the instruction signal to the wireless device as well as means for connecting to a voice-activated-dialing server via the wireless device. Additionally, the PTD may include means for receiving a voice command from a user via a microphone and means for encoding the voice command within a digital audio signal. Also, the PTD may include means for sending the digital audio signal to the voice-activated-dialing server via the wireless device. Furthermore, the PTD may connect to a terminal device via the wireless device in response to the voice-activated-dialing server recognizing the voice command encoded within the digital audio signal.

These as well as other features and advantages of the present embodiments will become apparent to those of ordinary skill in the art by reading the following detailed description, with appropriate reference to the accompanying drawings.

BRIEF DESCRIPTION OF THE DRAWINGS

Exemplary embodiments of the present invention are described herein with reference to the drawings, in which:

FIG. 2*b* is a perspective diagram of the hands-free unit of FIG. 2*a*;

FIG. 2*c* is another perspective diagram of the hands-free unit of FIG. 2*a*;

FIG. 3 is a perspective diagram of another hands-free unit according to an exemplary embodiment of the present invention;

FIG. 4 is a flowchart of the operation of the system of FIG. 1 according to an exemplary embodiment of the present invention;

DETAILED DESCRIPTION OF AN EXEMPLARY EMBODIMENT

Figure 1:
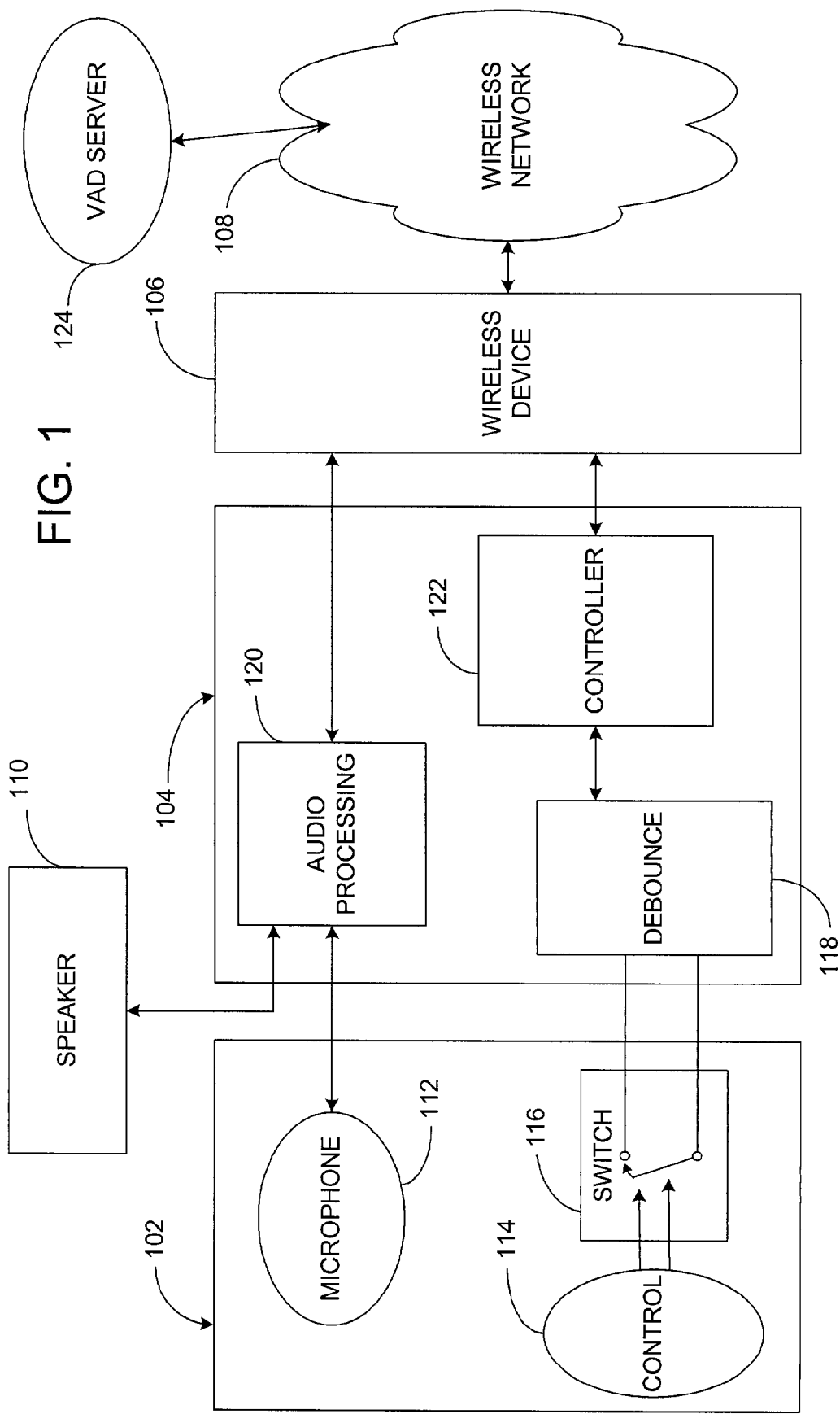
FIG. 1 is a block diagram of a system for implementing an exemplary embodiment of the present invention.

Referring to the drawings, FIG. 1 provides a block diagram of a system for use in an exemplary embodiment of the present invention. It should be understood that many of the elements described and illustrated throughout this specification are functional in nature and may be embodied in one or more physical entities or may take other forms beyond those described or depicted.

I. Exemplary System

The system shown in FIG. 1 includes a hands-free unit 102, a telephone interface module (TIM) 104 and a wireless subscriber terminal 106. The wireless subscriber terminal 106 (which may be a cellular telephone, a personal digital assistant, or any other type of wireless communication device for instance) is shown coupled to a wireless communications network 108 (such as a cellular radio-frequency network for instance), which includes or is coupled with (directly or through one or more other networks or communication paths) a voice-activated-dialing (VAD) server 124.

In an exemplary cellular network, for example, the wireless subscriber terminal 106 may communicate via an air interface with a base transceiver station (BTS) within a cell. The BTS may then convey signals from the mobile station to a base station controller (BSC) and in turn to a mobile switching center (MSC). Upon receipt of a request from the mobile station, the MSC may set up and establish a call path between the mobile station and a port on the VAD server.

An exemplary hands-free unit 102 may include a microphone 112, a single actuator (or, equivalently, "control") 114, and a switch 116. The TIM 104 may in turn include an audio processing module 120, a debounce module 118, and a controller 122. The actuator may be coupled with the switch. Further, the microphone 112 may be coupled to the audio processing module 120, and the switch 116 may be coupled to the debounce module 118. The debounce module 118 may in turn be coupled with the controller 122. Additionally, both the audio processing module 120 and the controller 122 may be coupled with the wireless subscriber terminal 106.

A. Exemplary Interfaces and System Location

The interfaces linking together the various components of the hands-free unit 102, the TIM 104 and the terminal 106 may be wired or wireless. For example, in one convenient embodiment, one or more of the interfaces may use shielded twisted pair wire (for audio connections) and a stranded copper wire (for all other connections). In another particularly convenient embodiment, for instance, one or more of the interfaces may be wireless interfaces facilitating communication between entities according to the well-known Bluetooth recommendation for short-range wireless communications.

In the exemplary embodiment, the hands-free unit 102, TIM 104, and terminal 106 are all situated in a vehicle (such as, for instance, a car, truck, plane, train, or ship), although the arrangement could just as well be in any other location such as an office, home, or on a person's body (e.g., as a portable hands-free unit). The hands-free unit 102 (or one or more of its constituent parts) is preferably situated in close proximity to a user (such as a driver for instance), so that the user's voice can be readily picked up by the microphone 112 and so that the user can readily engage the actuator 114. (As examples, the actuator 114 can be mounted onto the vehicle dashboard, or the actuator may be provided as a foot pedal. Other examples are possible as well.)

B. Exemplary Speaker and Microphone

A typical vehicle will include a speaker 110, to which the audio processing module 120 of the TIM 104 may be coupled, so as to facilitate emitting audio signals for the user to hear. Alternatively, the speaker 110 could just as well be a headphone or earphone or other device that functions to emit audio signals for a user to hear. The speaker 110 could be coupled to the TIM 104 or to another entity via a wired or wireless interface.

In the exemplary embodiment, the microphone 112 of hands-free unit 102 may be any type of microphone that functions to capture human speech or other audio signals. In particular, the microphone 112 preferably functions to capture human speech, to convert the speech into an analog electrical signal, and to send the analog electrical signal to the audio processing module 120 of TIM 104. The signal from the microphone 112 may be provided to the audio processing module 120 via a wired or wireless transmission or by any other means.

C. Exemplary Actuator

The actuator 114 can take any of a variety of forms as well. Preferably, however, the actuator should be easy for a user to operate, without unduly distracting the user. Without limitation, some examples of types of actuators include (i) a pushbutton switch or pedal, (ii) a heat-activated switch, (iii) a touch-sensitive pad, and (iv) a rotary dial. The actuator may have a number of preset positions or states (recognizing that an actuator without moving parts might not have "positions" but might have only "states" in relation to an underlying state machine or controller), such as "in" (e.g., on) and "out" (e.g., off) for instance. Other examples are possible as well.

In the exemplary embodiment as illustrated in FIG. 1, the control takes the form of a spring-loaded pushbutton device that works in combination with switch 116 to open or close an electrical circuit. By engaging the actuator 114, a user may cause the switch 116 to be closed, which may consequently cause an electrical signal to be sent (via a wired or wireless connection) from a signal source to the controller 122 of the TIM 104 or may otherwise cause the controller 122 to detect that the actuator 114 was engaged. Further, the electrical signal may effectively indicate a characteristic of the actuation. For instance, if the electrical signal lasts for a particular duration, the signal may indicate that the user engaged the actuator 114 for that duration.

D. Exemplary Audio Processing Module

The audio processing module 120 of the TIM 104 may function to convert an analog electrical signal provided from the microphone 112 into a digital electrical signal, which the TIM 104 may then provide to the wireless subscriber terminal 106 for transmission into network 108. Similarly, the audio processing module 120 may function to convert a digital signal provided from the wireless subscriber terminal 106 into an analog electrical signal, which the audio processing unit may then provide to speaker 110 to be emitted for a user to hear.

E. Exemplary Switch and Debounce Module

The debounce module 118 may function to clean the electrical signal provided from switch 116. In this regard, as the switch 116 is closed by a user engaging the actuator 114, the resulting electrical signal may contain spikes or other undesirable characteristics. The debounce module 118 may function by means well known to those skilled in the art to remove the spikes and other undesirable characteristics, so as to present a substantially "clean" electrical signal to the controller 122.

F. Exemplary Controller

The controller 122 may also take any of a variety of forms. For instance, the controller may comprise a microprocessor, a memory and various sets of machine language instructions (defining "routines", "programs" or "program logic") stored in the memory and executable by the microprocessor to carry out various functions described herein. Further, the memory, which may comprise volatile memory (e.g., RAM) and/or non-volatile memory (e.g, Flash), may serve to store data, such as indications of the state of subscriber terminal 106 (e.g., whether the terminal is on or off, whether the terminal is engaged in a call, and, if so, with whom the terminal is currently connected), indications of numbers or other digits or characters to have the terminal dial in particular instances, and a message set defining signals that can be sent to the wireless subscriber terminal so as to cause the subscriber terminal to carry out various functions. In an exemplary embodiment, the application program interface (API) or other data maintained by controller in memory can be modified or updated through a download from a server on wireless network 108 via terminal 106.

G. Exemplary Activation of Actuator

In the exemplary embodiment, when a user engages the actuator 114, the controller 122 may thus receive an actuation signal from the debounce module 118. Through responsive execution of a set of machine language instructions, the controller 122 may interpret the actuation signal as simply an indication that the actuator 114 has been engaged. Alternatively, the controller 122 may analyze the actuation signal and thereby determine that the signal lasted for at least a predefined duration, such as 1.5 seconds, for instance, which may cause the controller to conclude that the actuator has been engaged for at least that predefined duration. Still alternatively, the actuation signal may carry other possibly more specific information, which the controller 122 may be programmed to recognize.

Further, through its coupling with the wireless subscriber terminal 106, the controller 122 is preferably arranged to determine or to know the status of the wireless subscriber terminal at any given moment. For instance, the coupling between terminal 106 and controller 122 may carry signals indicating that the terminal is (i) powered on, (ii) currently engaged in a call, (iii) currently ringing—i.e., receiving an incoming call—, or any other particular state. The controller 122 may either have access to this status information via that coupling, and/or the controller 122 may store the status information in its memory for access when it needs it.

Communications, including status information, between the wireless subscriber terminal 106, the TIM 104, and/or the controller 122 may use a data signaling and control (DTC) protocol. For example, an open DTC protocol such as the AT communications protocol may be used, and, in particular, the command set within that protocol could be used. The protocol may be an open, non-proprietary protocol or a proprietary protocol. Other examples and types of protocols are possible. Additionally, status information may be communicated between the wireless subscriber terminal 106, the TIM 104 and/or the controller 122 using a packet of data that is, for example, one byte long. Other formats may be used to communicate status information as well.

In response to its receipt of an actuation signal, the controller 122 may programmatically analyze the actuation signal and may note the status of the wireless subscriber terminal 106. In the exemplary embodiment, the controller 122 may determine an action for the wireless subscriber terminal 106 to take, based on a combination of (i) information derived from the actuation signal and (ii) the status of the subscriber terminal 106. The action to be taken may itself take a variety of forms. By way of example, the action may be: (i) simulate dialing of a specified sequence of digits and/or characters, (ii) simulate dialing of the "Talk" key, or (iii) simulate dialing of the "End" key.

The controller 122 then preferably sends a signal to the wireless subscriber terminal 106 providing an instruction for the wireless subscriber terminal to take the designated action. The instruction signal may take any form (such as a code or series of codes for instance), as long as the subscriber terminal understands the meaning of the code (as a directive indicative of the action to be taken) and can therefore act responsively. The code may, for example, be a one-byte-long packet. Other data structures and other lengths are possible. When the wireless subscriber terminal 106 receives the instruction, it then responsively carries out the action indicated. For example, if the instruction is to dial the "*" digit, then the wireless subscriber terminal 106 preferably acts as if a user had manually dialed the "*" digit.

The action to be taken by the wireless subscriber terminal 106 may have various effects, depending on the state of the terminal, the state of an entity with which the terminal is currently communicating (if any), and the state of subscriber profiles in the network for instance. For example, if the terminal 106 is currently engaged in a call with another entity, then (i) if the action is dialing the "End" button, then the call may be terminated just as if the user had manually pressed the "End" button, and (ii) if the action is dialing a sequence of digits, then the digits would be received by the other entity and the result of dialing the digits may therefore depend on the configuration or state of the other entity. As another example, if the terminal 106 is not currently engaged in a call but is receiving a ring signal, then (i) if the action is dialing the "Talk" button, the terminal may answer the call, just as if the user had manually pressed the "Talk" button, while (ii) if the action is pressing a sequence of digits followed by the "Talk" button, then the terminal may initiate a call based on the dialed digits, just as if the user had manually dialed the digits. Other examples are possible as well.

H. Exemplary VAD Server

In an exemplary embodiment, the VAD server 124 may employ a speech-recognition module, which is typically arranged to receive speech signals and to recognize speech patterns in the signals by comparison to predefined speech patterns stored in a reference database. The speech patterns stored in the reference database may represent the most common phrases encountered in a given language, for instance, and therefore represent the phrases that are likely to be detected in speech signals received from users.

Additionally, the VAD server 124 may have access to an authorization database, indicating the identities of subscriber terminals that have subscribed to VAD service. The database may be keyed to mobile identification numbers (i.e., directory numbers) of subscriber terminals or any other information. The VAD server 124 preferably includes a processor, a memory, and a set of machine language instructions and data stored in the memory and executable by the processor to carry out various functions described herein. For instance, aside from being able to recognize and act upon speech signals from a user, the VAD server 124 may be programmed to recognize various tones (such as dual-tone-modulated-frequency (DTMF) tones) or data (e.g., a particular sequence of bits) and to take predefined actions in response. Thus, for instance, if a subscriber terminal in communication with the VAD server 124 emits a particular sequence of DTMF tones, the VAD server 124 may responsively take a respective, programmed action. A "**" tone sequence (i.e., the tones that would result if a user pressed the "*" key twice) may mean that the VAD server 124 should disconnect a call that is currently in progress.

Further, as is well known in the art, a local serving system (e.g., an MSC and/or visitor location register (VLR)) or a central controller (e.g., a service control point (SCP) or home location register (HLR)) may maintain profiles or logic that indicate where a switch should route a call in response to particular dialed digits. In the exemplary embodiment, one such profile may indicate that, when a subscriber terminal emits a particular digit or digit sequence to the switch, the switch should route the call to the VAD server 124 (which may be embodied in a service node (SN) or intelligent peripheral (IP) for instance) or to another designated platform or entity. For example, the profile may indicate that, when the switch receives the sole dialed digit "*" from a subscriber terminal, the switch should connect the terminal to the VAD server 124. Other examples are possible as well.

Table 1 provides examples of actuation signals, states of the terminal, responsive actions taken by the wireless subscriber terminal at the controller's instruction, and possible results of those actions in accordance with an exemplary embodiment of the invention. Of course, the examples provided in this table are illustrative only, and other examples are possible as well.

TABLE 1

| Actuation | Terminal State | Terminal Action | Result |
| --- | --- | --- | --- |
| One press | On and idle (and in a given service area) | Dial "*" and then "Talk" (which the service area recognizes as a feature code) | Telecom network connects the call to the VAD server or other such predefined entity. VAD server may then query the terminal for an authorization code, which the TIM controller may responsively cause the terminal to dial out. |
| One press | On an idle (and out of the given service area) | Dial 1-800-xxx-xxxx and then "Talk" | Telecom network connects the call to the VAD server or other such predefined entity. VAD server may then query the terminal for an authorization code, which the TIM controller may responsively cause the terminal to dial out. |
| Press and hold | In call | Dial "End" | Terminal disconnects the call in progress. |
| One press | Idle and ringing | Dial "Talk" | Terminal answers the incoming call. |
| One press | In VAD call | Dial "" sequence | VAD server recognizes the "" sequence as a request to disconnect the current call that the VAD server had connected for the terminal and to allow to user to speak another command. VAD server does so. |

II. Exemplary Embodiments of Hands-Free Unit

Figure 2A:
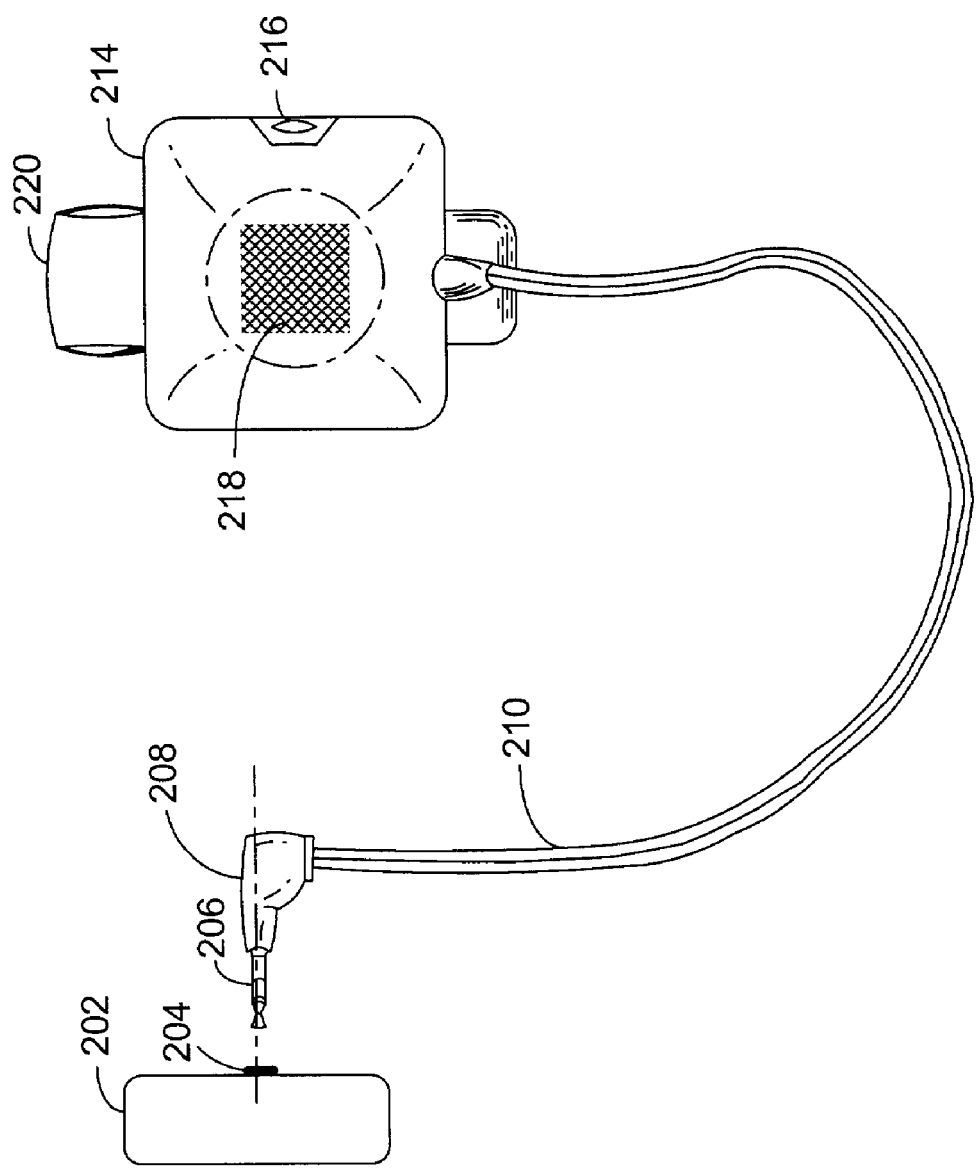
FIG. 2*a* is a perspective diagram of a hands-free unit according to an exemplary embodiment of the present invention.

Referring jointly now to FIGS. 2a, 2b, and 2c, an exemplary hands-free unit 214 with a push button actuator is shown. The hands-free unit 214 includes a push button control 216 and a microphone 218. The hands-free unit 214 may itself include the TIM. Thus, the hands-free unit may then be coupled to a wireless device 202 via a cable 210 and connector 208. The connector 208 may have an end portion 206 that can be inserted into a corresponding receptacle 204 in the wireless device. Further, the hands-free unit 214 may have a clip 220. The clip 220 may be used to connect the hands-free unit 214 to a person's clothes or to another entity.

FIG. 3 in turn shows another embodiment of an exemplary hands-free unit 318. In this other embodiment, the hands-free unit 318 includes a rotary dial 324 and a microphone 320. Further, as in the embodiment illustrated in FIG. 2, the hands-free unit may include the TIM and may be coupled to a wireless device (not shown) via a cable 326 and a connector (not shown).

III. Exemplary Method of Operation

Referring now to FIG. 4, a flowchart depicting an exemplary operation of the system shown in FIG. 1 is provided. The steps illustrated and described are meant only to be examples of possible functions. At step 402 in FIG. 4, a user may press a button or otherwise engage an actuator. At step 404, the TIM 104 then determines the state of the wireless device. In an exemplary embodiment, the wireless device 106 may be in one of the following three states: (i) powered on but idle, (ii) powered on, idle, and receiving an incoming call, or (iii) powered on and connected to a call. Other examples of states are possible, depending, for instance, on the type of wireless device at issue.

If the TIM 104 determines that the wireless device 106 is on and idle, then, at step 406, the TIM 104 sends a respective command sequence to the wireless device, causing the wireless device to dial the VAD server 124. The command sequence may, for instance, cause the wireless device 106 to dial a feature code that the telecommunications network may convert into a directory number of a port at the VAD server 124, or it may cause the wireless device 106 to dial a telephone number (such as a toll free number for instance) that will similarly amount to initiation of a call to the VAD server 124. The command "sequence" may be one or more digits and may take other forms and include other information as well.

Alternatively, if the TIM 104 determines that the wireless device 106 is on, idle and receiving an incoming call, then, at step 408, the TIM 104 issues a command to the wireless device 106 to answer the call, and the wireless device 106 would do so accordingly. Still alternatively, if the TIM 104 determines that the wireless device 106 is on and connected to a call, then, at step 410 the TIM 104 determines whether the actuation signal indicates that the user engaged the actuator for at least some predefined duration. If so, then, at step 412, the TIM 104 issues a command to the wireless device to terminate the call (whether or not the call was placed through the VAD server 124), and the wireless device 106 acts accordingly.

If the wireless device 106 is engaged in a call but the user did not press and hold the actuator, then, at step 414, the TIM 104 determines whether the current call is connected via the VAD server 126 (by reference to state information stored in the TIM controller's memory). If so, then, at step 416, the TIM 104 issues a command to the wireless device 106 to send a signal to the VAD server 124 that will instruct the VAD server 124 to terminate the current call but to stay connected with the wireless device 106 so as to allow the user to initiate another VAD-based call.

IV. Exemplary Telematics System

Figure 5:
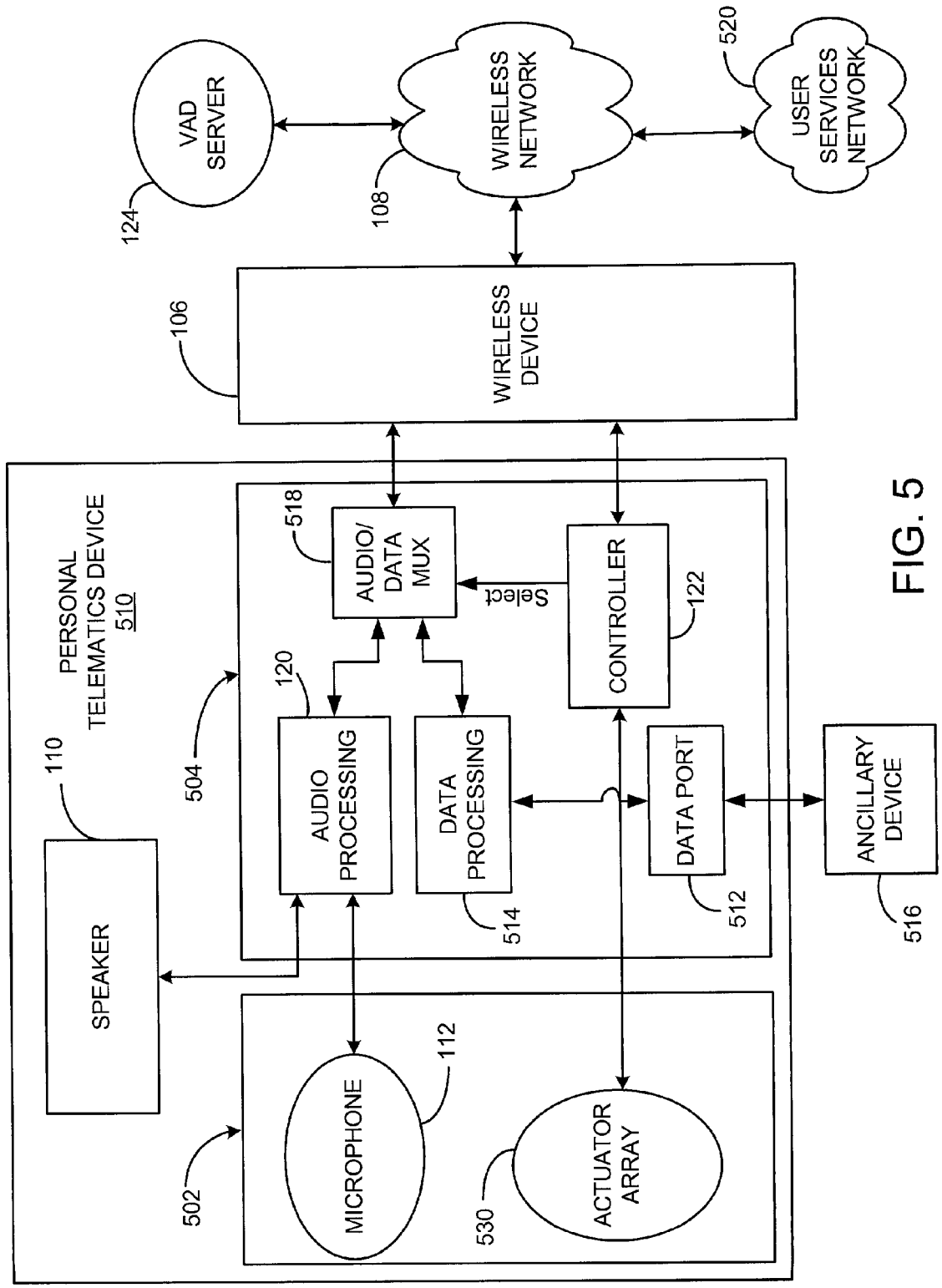
FIG. 5 is a block diagram of an exemplary telematics system.

Turning now to FIG. 5, an exemplary telematics system 500 is shown. The telematics system 500 may include a substantially similar speaker 110, microphone 112, audio processing unit 120, controller 122, wireless device (e.g., mobile station) 106, wireless communications network 108, and VAD server 124 as the system shown in FIG. 1. In the present embodiment, however, the hands-free unit 502 may include an actuator array 530 instead of the actuator 114. The actuator array 530 may include any number of actuators that are similar to the previously described actuator 114, and a user may activate any of these actuators. Although not shown in FIG. 5 for reasons of clarity and ease of reference, it should be noted that each actuator within the actuator array 530 may have its own switch and debounce module, similar to the system shown in FIG. 1.

Further in the present telematics system 500, a TIM 504 may include a data port 512 communicating with a data processing module 514 and an ancillary device 516 that is external to the TIM 504. In addition, an audio/data multiplexer (MUX) 518 may connect the audio processing module 120 and/or the data processing module 514 with the wireless device 106. Further, the controller 122 may have a select line that controls the operation of the MUX 518.

Additionally in the exemplary telematics system 500, a personal telematics device (PTD) 510 may include the hands-free unit 502, TIM 504, and speaker 110 all integrated together within a single component. In the present embodiment, the PTD 510 may be externally couplable to the wireless device 106, and the PTD 510 and wireless device 106 may both be situated within a vehicle (such as, for instance, a car, truck, plane, train, or ship). The wireless device 106 may enable the PTD 510 to communicate with the VAD server 124 and/or a user services network 520 via the wireless communications network 108.

It should be understood that in alternate embodiments, any of the entities within the telematics system 500 may include more or fewer components (e.g., the speaker 110 may be external to the PTD 510), and some of the entities shown within the telematics system 500 may be integrated together within a single component (e.g., the VAD server 124 may be part of the user services network 520).

A. Exemplary User Services Network

The user services network 520 depicted in FIG. 5 may include any number of servers, gateways, or other network entities. The user services network 520 may also include terminal devices (e.g., telephones, computers, personal digital assistants) that an operator can answer. In an exemplary embodiment, each of these entities within the user services network 520 may perform various user services by providing and/or receiving information from a user. To illustrate, in an exemplary scenario, a user may receive various types of information from the user services network 520, such as traffic information (e.g., an up-to-date traffic report for a certain highway), or navigation information (e.g., detailed directions to a location) Alternatively, a user may provide information to the user services network 520 that enables the network 520 to perform a user service, such as by providing a location of a vehicle for a roadside assistance service or an emergency (e.g., 911) service. It should be understood that the user services network 520 may additionally or alternatively provide any number of user services not specified here. Furthermore, it should be understood that the VAD server 124 may alternatively be part of the user services network 520, and/or the VAD server 124 may also perform one or more user services for a user (e.g., by enabling voice-activated dialing).

B. Exemplary Data Port and Data Processing Module

In the present embodiment, the TIM 504 may include a data port 512 that communicates with a data processing module 514 having a processing unit and a memory. The data port 512 may send and receive ancillary data in communication with an ancillary device 516, which maybe any type of electronic device, such as a computer, electronic gaming unit, personal digital assistant, or media player (e.g., MP3 player, CD player, etc.) The ancillary data may include any type of analog or digital data, such as streaming audio and video files, MP3 files, database files, IP packets, and so forth. The data processing module 514 may process the ancillary data to prepare it for transmission to the wireless communications network 108 (e.g., packetizing data, adding headers to existing packets, etc.). Similarly, the data processing module 514 may process data received from the wireless communications network 108 via the wireless device 106. In an alternate embodiment, ancillary data may be sent and received in a raw format, and no processing may be needed. Thus, in such an embodiment, the data processing module 514 may be omitted from the TIM 504.

1. Exemplary Downloading of Configuration Data

In an exemplary scenario, the data port 512 may be a Universal Serial Bus (USB) or Recommended Standard 232 (RS232) port that connects to the ancillary device 516 (e.g., computer) via a data connection mechanism (e.g., USB or RS232 cable). The ancillary device 516 may download configuration data (e.g., software patches) from a data network such as the Internet. The data processing module 514 may then receive the configuration data via the data port 512, and use the configuration data to alter software code within the controller 122 or another component within the PTD 510. Preferably, the configuration data may provide the PTD 510 with additional functionality or the ability to interface with additional wireless devices.

2. Exemplary Scenario for Enabling the Ancillary Device to Access a Data Network Furthermore, in another exemplary scenario, the user services network 520 may perform a user service for the ancillary device 516 by enabling the ancillary device 516 to access a data network. For example, the ancillary data sent from the ancillary device 516 (e.g., computer) to the data port 512 may include a request to connect the ancillary device 516 to a gateway within the user services network 520. The gateway in turn may connect, for instance, to a data network such as the Internet. Thus, if the gateway accepts the connection from the ancillary device 516, the ancillary device 516 may be able to send and receive data with the data network connected to the gateway via the PTD 510 and the wireless device 106.

C. Exemplary Data/Audio Multiplexer

In the present embodiment, the PTD 510 may connect to the wireless device 106 via a serial cable, as will be described later. Since serial transmission typically restricts the number of devices that can be coupled together, the TIM 504 may include a data/audio multiplexer (MUX) 518 for choosing whether the data processing module 514 or the audio processing module 120 communicates with the wireless device 106 at any given time. The controller 122 may manage the operation of the data/audio MUX 518 through a select line to the MUX 518.

In the present embodiment, the controller 122 may select whether the data processing module 514 or the audio processing module 120 communicates with the wireless device 106 based on the relative priorities of calls involving these two modules. For example, a 911 emergency audio call involving the audio processing module 120 will likely take priority over a standard data transfer involving the data processing module 514; hence in this scenario, the controller 122 will likely use the MUX 518 to select the audio processing module 120. When determining the relative priorities of calls, the controller 122 may access a priority table that matches call types to priority levels.

It should be understood that the controller 122 may select the MUX 518 based on a number of other factors that may relate to the current state of the PTD 510, such as the number of ongoing calls, the duration of the calls, and the amount of data transferred within each of the calls. It should be further understood that in an alternate embodiment, a different connection mechanism may be used between the PTD 510 and the wireless device 106 that enables the audio processing module 120 and the data processing module 514 to communicate with the wireless device 106 simultaneously. In such an embodiment, the audio/data MUX 518 may be altogether eliminated from the PTD 510. In yet another alternate embodiment, the data processing module 514, the audio processing module 120, and/or the data/audio MUX 518 may be integrated within a single processing unit. Other variations are possible as well.

V. Exemplary Personal Telematics Device

Figure 6:
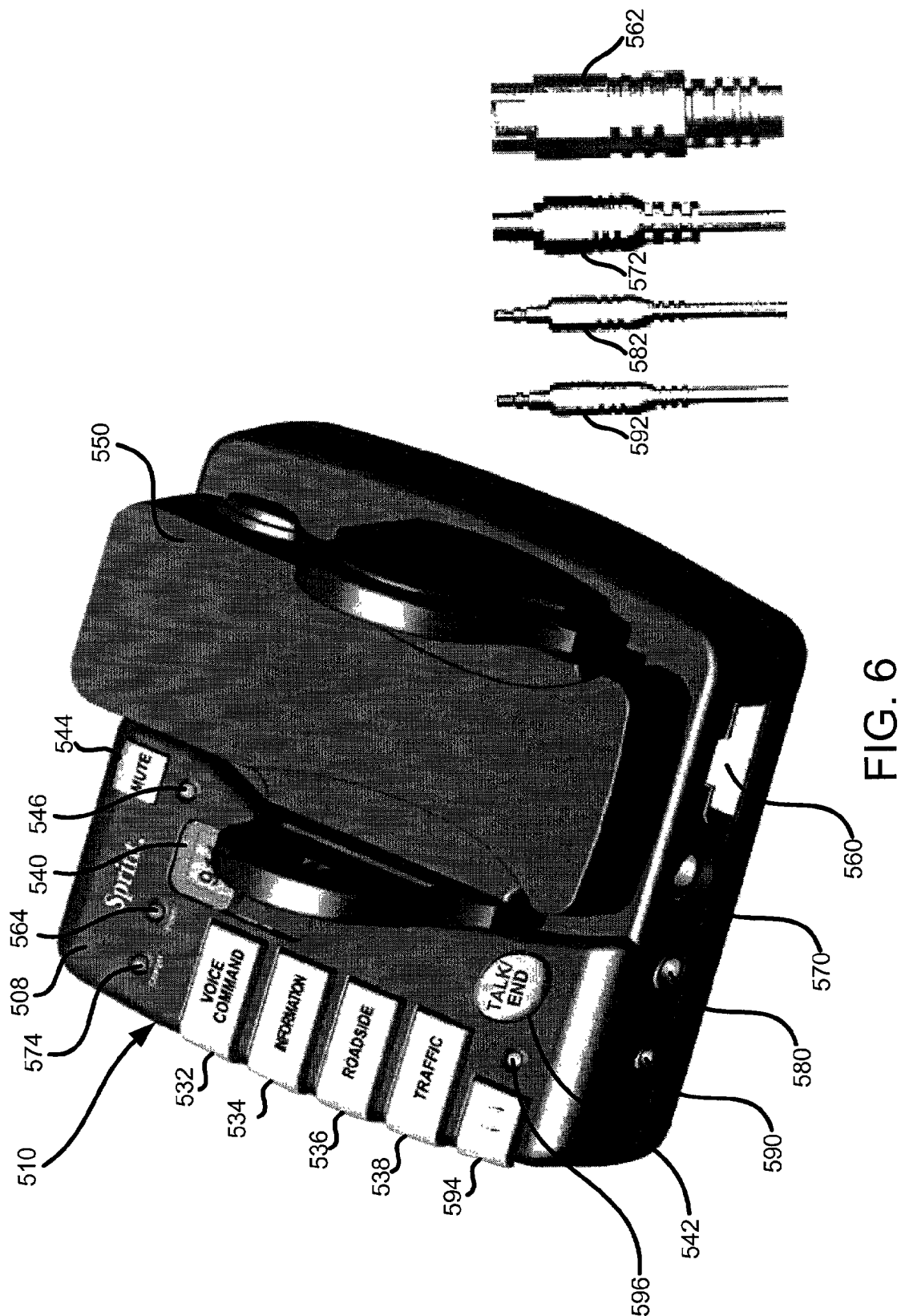
FIG. 6 is a diagram of an exemplary personal telematics device for use in the telematics system of FIG. 5.

Turning now to FIG. 6, the PTD 510 is shown in more detail. As described previously, the PTD 510 may be situated within a vehicle, although the arrangement could work in any other location, such as an office, home, or on a person's body. Additionally, the PTD 510 is preferably portable and thus, may be removable from the vehicle and transferred, for example, to another vehicle. The exemplary PTD 510 can be mounted in any location within the vehicle, such as off the side of a vehicle console (e.g., on the dashboard of a car), or in a stand within a cup holder. An exemplary mechanism for mounting the PTD 510 will be described in more detail later.

A. Exemplary Exterior Casing

In the present embodiment, the PTD 510 has an exterior casing 508 that is preferably made of plastic or another such durable material, though any material may be used. The exterior casing 508 may protect various interior components of the PTD 510 (e.g., audio processing module 120, controller 122, data processing module 514, etc.) as well as keeping such components within an integrated housing. It should be understood that in alternate embodiments, any of the components within the PTD 510 may be physically separate and outside of the exterior casing 508, or that the exterior casing 508 may be altogether omitted from the PTD 510.

B. Exemplary Actuators

As described previously, the PTD 510 may include an actuator array 530 having any number of actuators similar to the actuator 144 shown in FIG. 1. A user may activate an actuator in order to receive a user service from the user services network 520 and/or the VAD server 124. In the present embodiment, the actuator array 530 may include a voice command actuator 532, an information actuator 534, a roadside assistance actuator 536, a traffic actuator 538, and an emergency (911) actuator 540. It should be understood that any number of other types of actuators may also be used, such as a voice mail actuator for providing access to voice mail services, a "tourist" actuator for providing tourist information for a certain area, a "booking" actuator for booking tickets for shows, concerts, sporting events, flights, and so forth, and a user programmable actuator correlating to a user service chosen by the user.

The voice command actuator 532 preferably uses the same one-button functionality as described for the actuator 114. Thus, the voice command actuator 532 may enable a user to make a call to a terminal device (e.g., mobile telephone, landline telephone, personal digital assistant, etc.) simply by pressing the actuator 532 and audibly reciting dialing information for the terminal device (e.g., telephone number, name of person to be dialed, etc.) to the microphone 112. The microphone 112 in turn may create an analog audio signal that includes the dialing information. The microphone 112 may also forward the analog audio signal to the audio processing module 120, which may convert the analog audio signal into a digital audio signal and provide the digital audio signal to the audio/data MUX 518.

Furthermore, activation of the voice command actuator 532 may cause the actuator 532 to send an actuation signal to the controller 122. In response to the actuation signal, the controller 122 may enable the audio/data MUX 518 to forward the digital audio signal to the wireless device 106. Also in response to the actuation signal, the controller 122 may send an instruction signal to the wireless device 106 that instructs the wireless device 106 to send the digital audio signal to the VAD server 124. After the VAD server 124 receives the digital audio signal, the VAD server 124 may use various hardware and software mechanisms (e.g., databases, speech recognition software, etc.) for recognizing the dialing information included within the digital audio signal. The VAD server 124 may then connect the PTD 510 to the terminal device that was dialed.

Similar to activation of the voice command actuator 532, activation of any of the other actuators 534-540 may cause the activated actuator to send a respective actuation signal to the controller 122. In response to the actuation signal, the controller 122 may enable the audio/data MUX 518 to forward a digital audio signal received from the user to the wireless device 106. Also in response to the actuation signal, the controller 122 may send an instruction signal to the wireless device 106 that instructs the wireless device 106 to forward the digital audio signal to the user services network 520. An answering entity within the user services network 520, such as an automated server or an operator answering a terminal device, may eventually receive the digital audio signal. The answering entity may then perform a user service that corresponds to the type of actuator that the user activated. Additionally, if the user service involves sending information back to the user, the answering entity may include the desired information within an audio information signal (e.g., digital electrical signal) that is sent back to the PTD 510, converted to audio, and played to the user at the speakers 110.

To illustrate, if the information actuator 534 is activated, a server within the user services network may provide various types of information (e.g., navigation or weather information) to a user. The server may also use voice-recognition technology (e.g., similar to the VAD server 124 so that the user may provide a voice command to the server in order to obtain the desired information. Alternatively, a live operator may provide information in response to a request from the user.

In another exemplary scenario, activation of the roadside assistance actuator 536 may enable a user to provide information (e.g., location of a vehicle, type of problem with a vehicle) to a live operator answering a terminal device. Alternatively, an automated voice recognition system within a server may prompt the user for this information. Further, the live operator or server may also provide information to the user (e.g., estimated time when a tow truck will reach the user, estimated cost of service, etc.) via an audio information signal that is sent back to the PTD 510.

Activation of the traffic actuator 538 may enable a user to receive real-time traffic information from an automated server within the user services network 520 or from an operator. A user may provide general information concerning his location and/or destination, and the server and/or operator may respond with traffic information for these areas. Additionally, the server and/or operator may also provide recommendations for the user, such as projected routes that will take the shortest amount of time or distance.

Activation of the emergency actuator 540 may cause the PTD 510 to connect to an emergency operator who answers a terminal device (e.g., telephone) within the user services network 520. The user may inform the operator about the type and severity of the emergency, the location of the user, and other such information. The operator may then provide the user with instructions on how to handle the emergency as well as other pertinent information (e.g., the estimated time when an emergency crew will arrive to assist the user). Additionally, or alternatively, the server may also use voice-recognition technology in response to activation of the emergency actuator 540.

It should be understood that in alternate embodiments, the user services network 520 may provide a user service through a combination of automated servers and live operators. To illustrate, in an exemplary scenario, activation of the roadside assistance actuator 536 may first connect the PTD 510 to an automated server, which may use voice-recognition technology to establish the user's location. The server may then transfer the call to an area operator for the area including the user's location, and the area operator may communicate with the user in a more detailed manner concerning the roadside assistance service.

Additionally, it should be understood that the orientation of any of the actuators 532-540 within the PTD 510 may also vary in alternate embodiments. For example, the voice command actuator 532 may alternatively be below the actuators 534-538 on the PTD 510. Additionally, the actuators 532-540 may alternatively have different tactile surfaces so that a user may identify which actuator is being pressed through touch alone. Also, alternate embodiments may also include other types of actuating mechanisms, such as rotary dials, touch-sensitive electronic pads, or audio activation of an actuator by a user.

C. Exemplary Buttons

The PTD 510 may also include a single talk/end button 542 that a user may press either in order to receive a dial tone, or to terminate an existing call. It should be understood that in alternate embodiments, a large number of the actuators and buttons within the PTD 510 may employ one-button functionality so that the talk/end button 542 may be omitted from the PTD 510, or that the talk/end button 542 may provide an additional way to initiate and/or terminate a call.

The PTD may also include a mute button 544 that enables a user to mute the microphone 112, and a mute indicator 546 (e.g., light emitting diode (LED)) may light up when the user activates the mute button 544. Mute activation may be especially useful for preventing sounds emitted from the speaker 110 or ambient noise within the vehicle from disrupting a user service that depends on voice-recognition.

D. Exemplary Cradle

The PTD 510 may also include a wireless device cradle 550 for stowing or otherwise holding the wireless device with which the PTD 510 connects. In the present embodiment, a user may purchase a customized cradle (e.g., having a wide or narrow configuration) that is specially designed for the type of wireless device that the user employs, though alternatively, a "one-size-fits-all" type of cradle may be used. Further, in another alternate embodiment, the cradle 550 may have an adjustable width that the user can change in order to customize the size of the cradle 550. Additionally, it should be understood that although the present PTD 510 uses a cradle 550, other holding or stowing mechanisms (e.g., holding stand, spring-loaded tongs, magnet(s), etc.) may also be used.

E. Exemplary Connection Ports

The PTD 510 may also include a variety of ports by which other devices may connect. The PTD 510 may have a power port 560, which may connect to a power source via a power connection mechanism 562. In the present embodiment, the power source may be a cigarette lighter within the vehicle that provides a 12-15 volts direct current (DC) and ground to the PTD 510, though any type of power supply may alternatively be used. Further, when the PTD 510 is receiving electricity via the power port 560 and the power connection mechanism 562, a power indicator 564 (e.g., LED) may light up.

Additionally, the PTD 510 may also include a wireless device port 570 for sending and receiving data and audio information in communication with the wireless device 106. In the present embodiment, a device connection mechanism 572 may be a serial data cable that connects the wireless device port 570 to a pin-out port on the wireless device 106, though other types of connection mechanisms such as parallel data cables or wireless connection mechanisms may also be used. Additionally, the device connection mechanism 572 may be customized or otherwise have a form corresponding to a type of the wireless device 106. For example, the design of the device connection mechanism 572 may depend on the layout of the pin-out port of the wireless device 106. In this regard, the PTD 510 may further recognize a type of the wireless device 106 simply from the type of device connection mechanism 572 that is used. The controller 122 or other component within the PTD 510 may then store and access a database that matches the type of the wireless device 106 to specific connection parameters (e.g., what signal to send in order to initiate or terminate a call, the pin-out orientation of the port on the wireless device 106, etc.). The PTD 510 may then use these connection parameters while communicating with the wireless device 106.

In addition to enabling communication between the PTD 510 and the wireless device 106, the PTD 510 may use the wireless device port 570 and the device connection mechanism 572 to charge the wireless device 106 (e.g., by providing electricity received from the power source). A charge indicator (e.g., LED) 574 may light up when the wireless device 106 is charging.

The PTD 510 may also include a microphone port 580 for connecting an external microphone to the PTD. Furthermore, the PTD 510 may also include a headset port 590 for connecting to a headset (e.g., for one or two ears). Both of the ports 580, 590 may use wires 582, 592, respectively, having standard 2.5 mm or 0.5 mm jacks, though other types of connection mechanisms may alternatively be used.

The PTD 510 may also include a headset button 594 for controlling when audio output is played through the headset. In an exemplary arrangement, audio output is generally played through the speaker 110 unless the headset button 594 is depressed, in which case the audio output is played via the headset instead. The PTD 510 may also include a headset indicator 596 that lights up to indicate when a headset is being used. It should be noted that in an alternate embodiment, the PTD 510 may play audio output through the headset whenever it detects that a jack is plugged into the headset port 590, and therefore in such an embodiment, the headset button 594 may be omitted from the PTD 510.

It should be understood that the ports 560, 570, 580, 590 may alternatively employ different connection mechanisms when connecting to external devices. For example, the ports 560, 570, 580, 590 may alternatively use wireless connection mechanisms (e.g., Bluetooth, Institute for Electrical and Electronics Engineers (IEEE) 802.11, etc.) or come in direct physical contact with the external devices. Furthermore, more or fewer ports may be used in alternate embodiments. Other variations are possible as well.

F. Exemplary Additional Elements within the PTD

Additionally, although not depicted in FIG. 6, the PTD 510 may also include other elements, such as a carrying case for carrying and protecting the PTD 510. The PTD 510 may also include an antenna for improving the signal strength of the wireless device 106 that is externally couplable to the PTD 510. Furthermore, in alternate embodiments, the PTD 510 may include a Global Positioning System (GPS) transceiver or other location positioning system transceiver to receive location data. The location data may be provided to a server within the user services network 520, for example, in order to locate a vehicle while performing a roadside assistance service or emergency service.

Figure 7A:
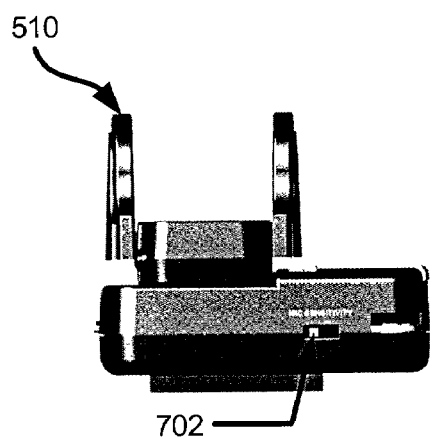
FIGS. 7a-c are additional diagrams of the personal telematics device of FIG. 6.
Figure 7B:
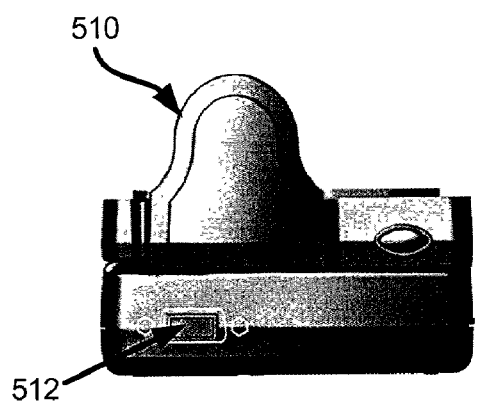
Figure 7C:
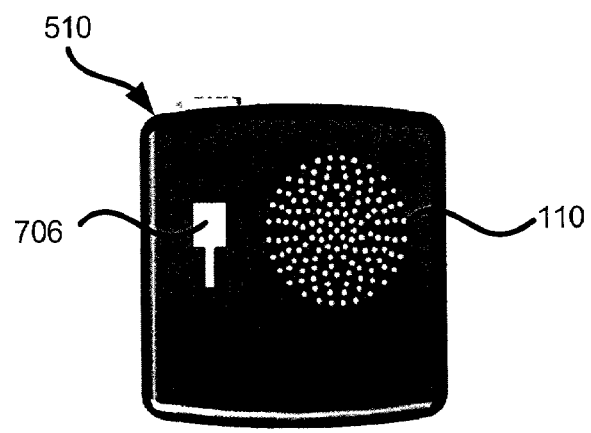

Turning now to FIGS. 7a-c, additional views of the PTD 510 are shown. In FIG. 7a, a microphone sensitivity control 702 is shown, which the user may adjust to control the sensitivity of the microphone 112. FIG. 7b shows the previously described data port 512, which in the present embodiment may be a USB or RS232 port that connects the PTD 510 to the ancillary device 516 via an USB or RS232 connection, respectively. FIG. 7c shows an underside of the PTD 510 that includes the speaker 110. Thus, in the present embodiment, the speaker 110 may be underneath the PTD 510, and sound emitted from the speaker 110 may reflect off of the surface below the PTD 510 back to the user. Alternatively, the speaker 110 may be located anywhere on the PTD 510, or the speaker 110 may be separate from the PTD 510. For example, in an alternate embodiment, the PTD 510 may use preexisting car speakers for emitting sound. Alternatively, a user could use a headset (e.g., via the headset port 590) or speakerphone capabilities with the PTD 510 and/or wireless device 106 in order to receive audio. Other arrangements are possible as well.

G. Exemplary Mounting of a Personal Telematics Device

Figure 8A:
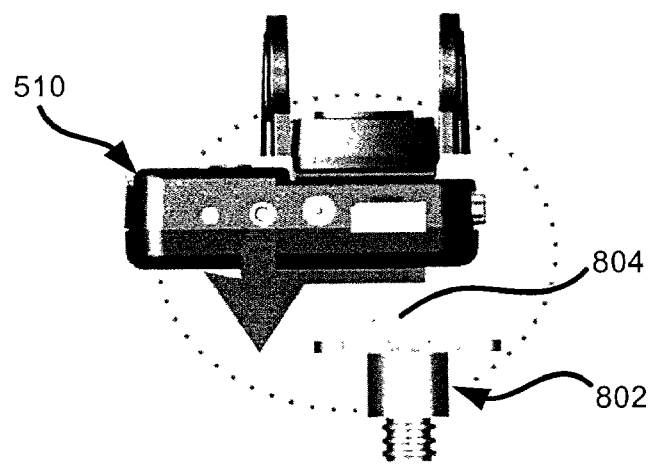
FIGS. 8a-c are diagrams of the personal telematics device of FIG. 6 connecting to a holding stand.
Figure 8B:
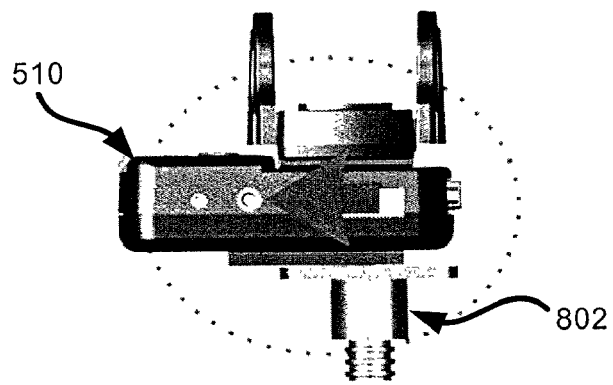
Figure 8C:
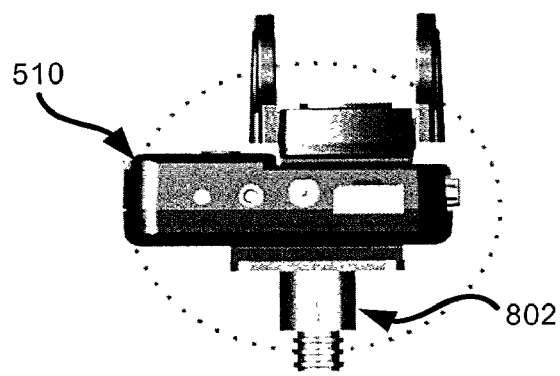

Also shown in FIG. 7c is a connection slot 706 present on the underside of the PTD 510 that is used to mount the PTD 510 on a holding stand. FIGS. 8a-c show in more detail how the PTD 510 may be mounted on such a holding stand 802.

In an exemplary embodiment, the holding stand 802 may be any type of rigid material (e.g., plastic, metal) that can be placed anywhere within a vehicle (e.g., within a cup holder). The exemplary holding stand 802 may include a notch 804 that is preferably interlocking with the connection slot 706 on the underside of the PTD 510. As depicted in FIG. 8a, the PTD 510 may be placed over the holding stand 802. In FIG. 8b, a user places the PTD 510 on the holding stand 802, and moves the PTD 510 and/or the holding stand 802 so that with the notch 804 slides into the connection slot 706. In FIG. 8c, a connection between the PTD 510 and the holding stand 802 may be complete, as the notch 804 and connection slot 706 are preferably interlocked. It should be understood that the mounting mechanism illustrated in FIGS. 8a-c is merely exemplary, and that other mounting and/or connecting mechanisms (e.g., Velcro®, fastening cables, various adhesives, etc.) may be used to secure the PTD 510 within a vehicle.

H. Exemplary Pushbutton Actuator

Figure 9B:
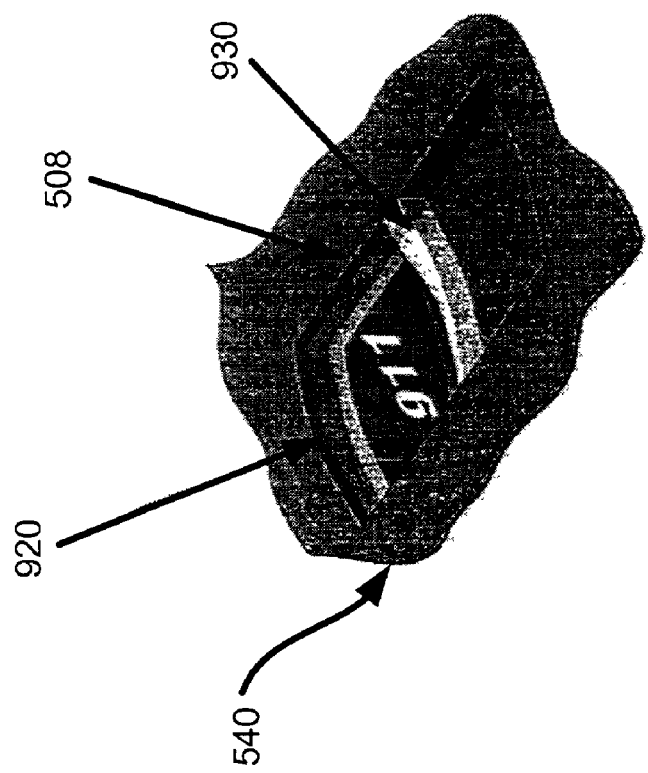
FIGS. 9a-b are diagrams of actuators within the personal telematics device of FIG. 5.
Figure 9A:
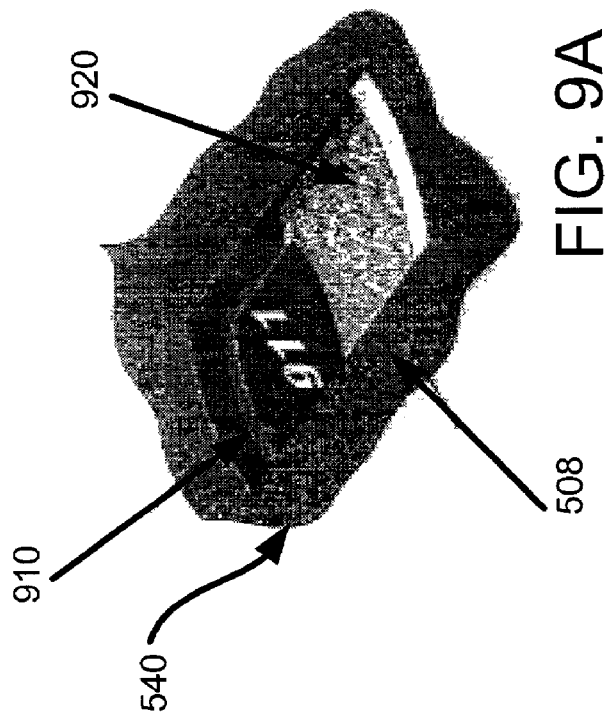

FIGS. 9a-b show the exemplary emergency actuator 540 of the PTD 510 in more detail. In the present embodiment, the emergency actuator 540 may be recessed within the PTD casing 508. Additionally, FIG. 9a shows an "open position" for the emergency actuator 540, with an actuating mechanism 910 (e.g., pushbutton) exposed. Thus, a user may press the actuating mechanism 910 when the emergency actuator 540 is in the open position in order to initiate an emergency user service.

FIG. 9b shows a closed position for the emergency actuator 540, with a cover 920 on top of the actuating mechanism 910 preventing a user from inadvertently activating the emergency actuator 540. In the present embodiment, the cover 920 may be slideable, clear, and plastic, though this may vary in alternate embodiments. Additionally, the exemplary cover 920 may have a finger grip 930 for helping the user slide the cover between the open and closed positions. It should be understood that although the design shown in FIGS. 7a-b is used with the emergency actuator

540, in alternate embodiments, the present design could be used with any of the actuators or buttons 532-544.

The present embodiments may include a number of advantages. For example, the exemplary PTD 510 may be relatively inexpensive since it uses an existing wireless device 106 (e.g., cellular phone) for receiving user services rather than having an embedded wireless transceiver. Additionally, the exemplary PTD 510 is preferably portable and thus, may be transferred from one vehicle to another. Thus, a user may use a single PTD 510 to service multiple vehicles. Furthermore, the exemplary PTD 510 may enable the ancillary device 516 to access a data network, such as the Internet, which may provide the ancillary device 516 with capabilities such as wireless web browsing.

It should be understood that a wide variety of changes and modifications may be made to the exemplary embodiments described above. For example, certain components, functions, and operations of the present embodiments may be accomplished with hardware, software, or a combination of the two. It is therefore intended that the foregoing description illustrates rather than limits this invention, and that it is the following claims, including all equivalents, that define this invention.

What is claimed is:

1. A personal telematics device couplable externally to a wireless device having access to a wireless network, the personal telematics device comprising:
   a voice command actuator that can be selectively activated by a user;
   a controller in communication with the actuator, wherein the controller sends an instruction signal to the wireless device in response to activation of the actuator;
   a microphone for converting a speech signal received from the user into an analog audio signal; and
   an audio processing module for converting the analog audio signal into a digital audio signal, wherein the digital audio signal is sent to the wireless device,
   wherein the wireless device wirelessly connects the personal telematics device to an answering entity in response to receiving the instruction signal, wherein the answering entity performs a user service corresponding to the actuator activated by the user, wherein the answering entity comprises a voice-activated-dialing server accessed by the wireless device via the wireless network, and wherein the digital audio signal includes a telephone number for a terminal device.

2. The personal telematics device of claim 1, wherein the wireless device sends the digital audio signal to the voice-activated-dialing server in response to receiving the instruction signal, and the voice-activated-dialing server connects the personal telematics device to the terminal device in response to recognizing the telephone number included within the digital audio signal.

3. The personal telematics device of claim 1, wherein the answering entity performs the user service at least in part by sending an audio information signal to the personal telematics device via the wireless device.

4. The personal telematics device of claim 3 further comprising a speaker for playing to the user sound encoded within the audio information signal.

5. The personal telematics device of claim 1, wherein the user service comprises at least one of a voice command service, an information service, a roadside assistance service, a traffic service, an emergency service, a voice mail service, and a navigation service.

6. The personal telematics device of claim 1, wherein the personal telematics device is portable and locatable within a vehicle.

7. The personal telematics device of claim 1, wherein the controller comprises a processor, a memory, and a set of machine language instructions stored in the memory and executable by the processor.

8. The personal telematics device of claim 7, wherein the controller determines an action to be taken by the wireless device based on a status of the wireless device and activation of the actuator, and the controller generates the instruction signal.

9. The personal telematics device of claim 1 further comprising a data port for communicating with an ancillary device.

10. The personal telematics device of claim 9, wherein the data port comprises at least one of a Universal Serial Bus port and a Recommended Standard 232 port that receives configuration data from the ancillary device.

11. The personal telematics device of claim 9, wherein the ancillary device comprises at least one of a computer, an electronic gaming machine, a personal digital assistant, and a media player.

12. The personal telematics device of claim 9, wherein the answering entity performs a user service for the ancillary device via the personal telematics device and the wireless device.

13. The personal telematics device of claim 12, wherein the user service comprises enabling access to a data network.

14. The personal telematics device of claim 1 further comprising a power port for receiving electricity from a power source, and a wireless device port for communicating with the wireless device via a device connection mechanism.

15. The personal telematics device of claim 14, wherein the device connection mechanism provides electricity to charge the wireless device, and the device connection mechanism has a form corresponding to a type of the wireless device.

16. The personal telematics device of claim 1 further comprising at least one of a headset port for connecting to a headset for at least one ear, and a microphone port for connecting to the microphone.

17. The personal telematics device of claim 1, wherein the actuator comprises a spring-loaded pushbutton device that can be pressed by the user.

18. The personal telematics device of claim 1 further comprising means for stowing the wireless device.

19. A method carried out at a personal telematics device couplable externally to a wireless device having access to a wireless network, the method comprising:
   initiating an instruction signal in response to a user activating a voice command actuator;
   sending the instruction signal to the wireless device;
   accessing a voice-activated-dialing server via the wireless network using the wireless device;
   receiving a voice command from a user via a microphone;
   encoding the voice command within a digital audio signal; and
   sending the digital audio signal to the voice-activated-dialing server via the wireless device,
   whereby the personal telematics device connects to a terminal device via the wireless device in response to the voice-activated-dialing server recognizing the voice command encoded within the digital audio signal.

20. The wireless communication method of claim 19, wherein the voice command comprises an audio recitation of a telephone number of the terminal device.

21. The wireless communication method of claim 19 further comprising carrying out the method in a vehicle.

22. The wireless communication method of claim 19 further comprising providing electricity to the wireless device for charging the wireless device.

23. The wireless communication method of claim 19 further comprising receiving ancillary data from an ancillary device for communication, in turn, to the terminal device.

24. The wireless communication method of claim 19 further comprising a computer readable medium having stored therein instructions for causing a processor to execute the steps of the method of claim 19.

* * * * *